Jan. 21, 1969     C. H. GARSON     3,422,536
TYPODONT
Filed Sept. 13, 1966
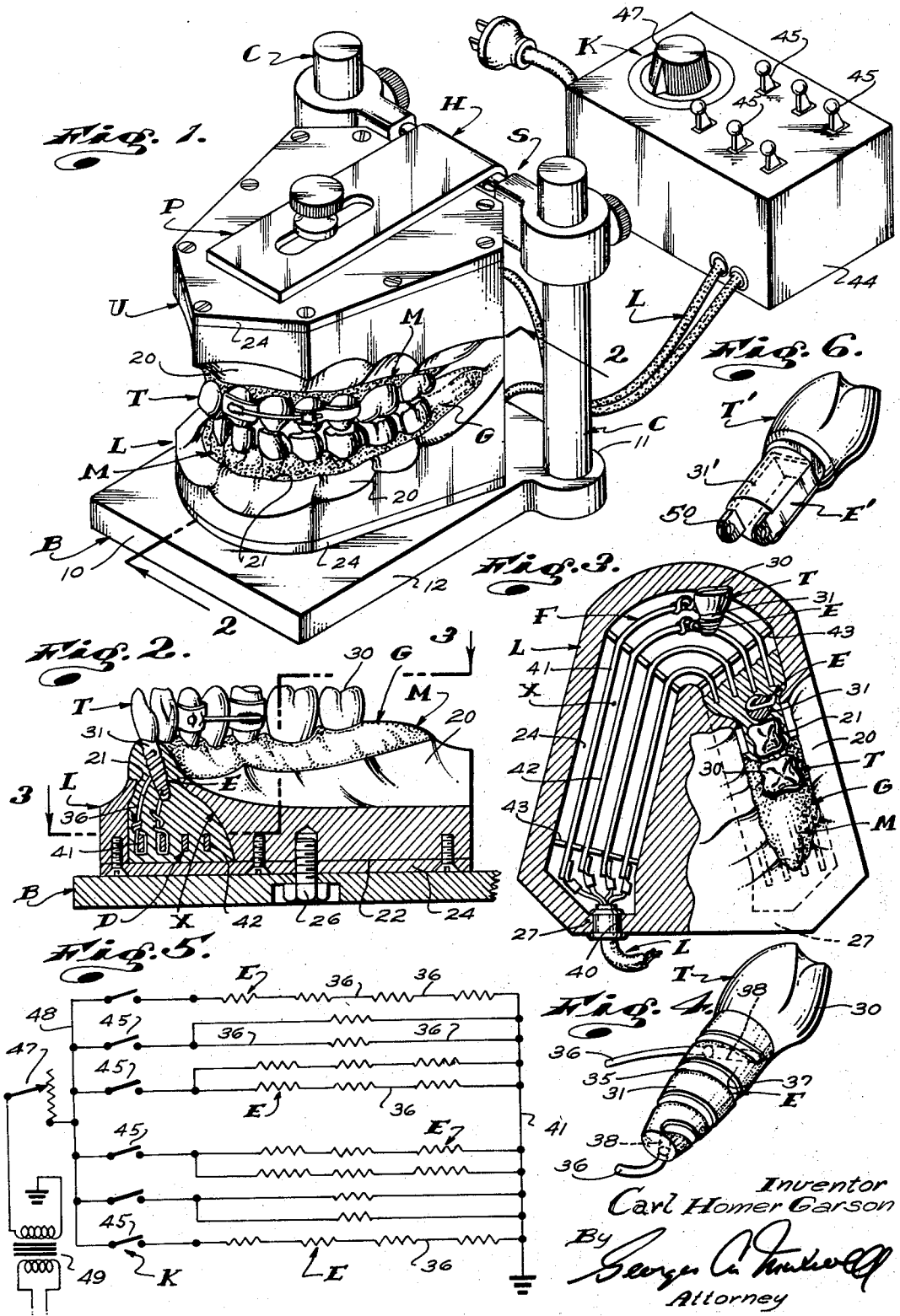
Inventor
Carl Homer Garson
By
Attorney

United States Patent Office 3,422,536
Patented Jan. 21, 1969

3,422,536
TYPODONT
Carl Homer Garson, 9201 Sunset Blvd.,
Los Angeles, Calif. 90069
Filed Sept. 13, 1966, Ser. No. 578,621
U.S. Cl. 32—71        10 Claims
Int. Cl. A61c *19/00;* G09b *19/00;* G09b *23/28*

This invention has to do with an educational and/or training apparatus and is more particularly concerned with that type or class of device commonly referred to as a typodont and which is employed to teach and train one in the art and science of orthodontics.

Orthodontics, that branch of dentistry which is concerned with the correction of irregularities and faulty positioning of the teeth and is a highly specialized and exacting science and art which requires the exercise of great skill. Since the development of such skill cannot be left to change and since a trainee cannot, at the outset of his training, be permitted to practice by trial and error on live patients, certain and specialized training apparatus, simulating the human jaw and teeth structures have been developed and are employed. The most typical and widely used training apparatus in use today is a typodont, which apparatus consists of a standard on which is mounted, in predetermined position or relationship, lower carriers formed to resemble necessary or desired portions of the mandible or lower jaw of a person and/or an upper carrier formed to resemble necessary or desired portions of the maxilla or upper jaw of a person. (For the purpose of this disclosure, the upper and lower jaw-like carriers, referred to above, will be called "jaws.")

The upper and lower jaws are provided with recesses into which is poured or otherwise deposited a wax or wax-like matrix in which simualted or model teeth are set. The matrix is relatively stiff and hard at normal room temperatures, for example, 72° F. and has a melting point below 212° F., with the result that the matrix can be advantageously softened, for the purpose of freely shifting and varying the position of the teeth set therein, by submerging the apparatus in hot water. The matrix can, if desired, be removed from the jaws by submerging the appaartus in boiling water.

In the normal use of a typodont, the apparatus is heated to soften the matrix and one or more of the teeth are shifted to predetermined improper positions. The matrix is then allowed to cool and harden. Subsequently, a student demonstrating technique and/or practicing his skill applies certain mechanical means, such as tensioning wires, bands, wedges and other hardware onto and about the improperly positioned teeth and other adjacent teeth, which mechanical means must be set and biased to normally yielding urge and move the improperly positioned teeth toward their normal and/or proper position in the jaw or jaws and with said other teeth related thereto. Pressures exerted by the mechanical means must be relatively light and such that they would not break the teeth, bruise the jaws and cause discomfort and pain to a living person. The pressures encountered are so slight or light that in a living person the movement effected would be slight and would take place over a prolonged period of time. In the case of a typodont, the matrix is such that if excessive pressures are developed, by and through the mechanical means, the matrix will crack or part from the teeth. On the other hand, the matrix is such that upon the application of slight and proper pressure by the mechanical means, the teeth will not move unless and until the matrix is heated and softened, whereupon the movement of the teeth sought to be attained takes place immediately.

Accordingly, an instructor can effectively demonstrate and a student can engage in the simulated practice of the art and science of orthodontics without live patients and at an extremely accelerated rate.

As pointed out above, in the art as it now stands, the typodont when used must be submerged in hot water to heat and soften the matrix. This requirement is extremely inconvenient as it requires moving and manipulating the apparatus about, and requires that a large and substantial constant supply of hot water be maintained. More important, when submerging the typodont in hot water to gain the desired softening of the matrix, the typodont is normally inverted and is obscured from view whereby actual movement of the teeth cannot be viewed.

Further, considerable or protracted periods of time are required to heat and cool the typodont, since the entire structure must be heated and cooled.

An object of the invention is to provide an improved typodont which is such that the apparatus need not be moved or otherwise manipulated to effect heating and softening of the matrix and which is such that actual movement of the teeth can be viewed.

A further object of my invention is to provide an apparatus of the character referred to which is such that the temperature of the matrix and the rate at which the temperature of the matrix is varied can be accurately controlled within fine limits, whereby the speed of movement of the teeth can be controlled.

Yet another object is to provide an apparatus which is such that only that portion of the matrix which needs to be heated to effect the desired movement of one or a selected number of teeth can be effected, whereby heating and cooling of the apparatus is greatly accelerated and whereby the control and latitude of use of the typodont is greatly increased.

It is another object and feature of my invention to provide a typodont with electroheating means for the matrix.

Still further, it is an object of my invention to provide electric heating means in the matrix cavities and/or on the teeth.

Yet another object of the invention is to provide a suitable control means for the heating means whereby heating of the matrix can be controlled as desired.

Finally, it is an object of the invention to provide an apparatus of the character referred to which is easy and economical to manufacture, easy and convenient to use and which is both highly effective and dependable in operation.

The various objects and features of my invention will be fully understood from the following detailed description of typical preferred forms and applications of my invention, throughout which description reference is made to the accompanying drawings, in which:

FIG. 1 is an isometric view of an apparatus embodying the pressure invention;

FIG. 2 is a sectional view taken as indicated by line 2—2 on FIG. 1;

FIG. 3 is a view taken substantially as indicated by line 3—3 on FIG. 2;

FIG. 4 is an isometric view of a tooth construction;

FIG. 5 is a view showing a wiring diagram; and,

FIG. 6 is a view similar to FIG. 4 showing a modified tooth construction.

The typodont A that I provide and which is illustrated in the accompanying drawings includes, generally, a flat horizontally disposed plate-like platform B having front, rear and side edges 10, 11 and 12 and is adapted to be engaged on a suitable support surface, such as a table or laboratory bench and to support a lower jaw unit L, a pair of laterally spaced, upwardly projecting columns C on the platform adjacent the rear edge thereof, a vertically shiftable carriage or spreader S carried by and extending horizontally and laterally between the columns, a flat, normally horizontally disposed carrier plate P arranged forward of the spreaded S to overlie the platform and adapted to carry an upper jaw unit U and hinge means H coupling the plate P to the spreader S whereby the plate P, with the upper jaw unit U related thereto, can be pivoted upwardly and downwardly so as to move the upper and lower jaw units into and out of engagement with each other as circumstances required or as desired.

The general set up or apparatus thus far described can vary widely without departing from the spirit of this invention and is only illustrative of one application and form of my invention.

The upper and lower jaw units U and L are substantially alike, each involving a cast metal part or shell one side or surface of which, hereinafter referred to as the inner surface 20, is of the same general exterior configuration of those portions of the human jaw it simulates which are disposed towards the interior of the mouth and the other jaw. The shell is further provided with a substantially U-shaped slot 21 about that portion where, in a human jaw, the teeth are arranged and into which the roots of teeth extend. The other or opposite surface 22 of the shell D is flat and smooth and is provided with a cover plate 23, fixed thereto as by means of suitable screw fasteners 24 and which serves to overlie and close the outer end of the slot 21 so as to define an inwardly opening U-shaped cavity X.

The cover plate 23 is, in the case illusustrated, provided with a threaded opening in its central portion to cooperatively receive a screw fastener 26 carried by the platform B or the plate P, whichever the case might be, to facilitate releasably securing the unit thereto.

For the purpose of this disclosure, the shell D, with the cover plate 24 related thereto, is an integral unit and may be referred to as a simulated jaw bone with an inwardly opening U-shaped cavity.

It is to be noted that the slot 21 and resulting cavity X need not have straight or parallel sides, but can have outwardly divergent sides whereby the cavity is enlarged with the simulated jaw bone.

The ends of the cavity, which occur at the rear of the simulated jaw bone are closed by rear walls 27 of the shell.

In addition to the foregoing, each of the units U and L is provided with a matrix M which is adapted to simulate the human gums related to the jaw bone and in which teeth are set and carried. The matrix M is poured into the cavity X, to fill the cavity and to project inwardly and out from the cavity. The exterior configuration of that portion of the matrix which projects inwardly and out from the cavity X, hereinafter referred to as the gum portion G, is formed to simulate the human gums, in exterior configuration and is established in that form by use of a suitable mold (not shown) used in connection with the simulated jaw bone, when the matrix is poured into said jaw bone.

The matrix M is established of a suitable moldable wax or wax-like substance which, at normal room temperatures, for example 65° F. and 75° F., is hard and preferably somewhat brittle, which is such that when heated to, for example, 120° F. to 130° F., it softens sufficiently to flow when subjected to external forces and pressures and which is such that when heated to, for example, 180° F. to 200° F. (below 212° F., or the boiling point of water), it becomes molten.

Still further, each of the units U and L includes a plurality of simulated teeth T, there being at least one complete set of such teeth for each unit. In practice, several sets of teeth, of different size and/or a set or sets of teeth of unique form and shape and simulating common or typical deformed tooth formations can be provided.

Each tooth T includes an inner crown portion 30 and a root portion 31. The crown portion 3 is formed to resemble the crown of the particular tooth it is intended to simulate, that is, to resemble an incisor, bicuspid, molar, or the like.

The root portion 31 is, in the form of the invention shown in FIGS. 1 to 4, an elongate, substantially cylindrical portion and, accordingly, is distinct and distinguishable from the root structure of a real tooth.

The teeth T are molded of a suitable heat resistant dielectric ceramic or plastic material and can have their crown portions glazed with a suitable porcelain, or the like, if desired or if circumstances require.

The root portion 31 of each tooth is provided with and carries a resistance heater element E established of suitable resistance wire 35 wound about the root with the convolutions thereof in insulated spaced relationship and has lead ends 36 extending outwardly from the tooth.

In the case illustrated, the root portion 31 of the tooth T is provided with an axially and circumferentially extending outwardly opening helical groove 37 in which the resistance wire 35 is seated and is provided with transverse openings 38 at the ends of the groove and through which the lead ends 36 of the wire are engaged to anchor and hold the wire in proper position in the groove.

Each tooth T is adapted to be related in predetermined relationship with the matrix M, with the root portion 31 thereof extending into the matrix and with the crown portion 30 thereof projecting out and inwardly therefrom. The heater element E is provided to selectively heat the wax-like material of the matrix about the root portion 31 of the tooth to such an extent that the wax becomes somewhat soft and pliable and so that the tooth, by the application of external pressure on the crown portion thereof, can be shifted, moved about and place in another, different and desirable position relative to the gum portion G of the matrix.

It is to be noted that the heater element is not intended to raise the temperature of the wax to any great extent and is therefore a relatively low resistance type of resistance heat element and requires or draws little current.

In addition to the foregoing, the construction that I provide includes power supply means F for the heater elements E of the several teeth T and control means K for said power supply means and operable to selectively energize the several heater elements E and to vary the flow of current thereto.

In practice, the power supply and control means can be varied widely in form and construction.

If it is desired to energize and control each of the heater elements E separately, each of the lead ends of the elements are connected with separate power supply and ground lines. The pairs of lines for the several elements extend from a suitable control means remote from the typodont, through suitable openings 40 in the rear walls 27 of the shells D and through and about the cavity X as required. The control means includes an on and off switch related to each supply line and connected with a bus bar, which bar is connected with a manually operable rheostat. The rheostat is connected with a step down transformer, which transformer is energized by and from a power service outlet.

Since the above circuitry is extremely basic and simple, illustration and further explanation thereof will be dispensed with so as not to unduly burden this specification.

In practice, if desired, the adjacent leads of two or more adjacent teeth can be connected together to arrange the several related heater elements in series and the remote lead ends of the end teeth can be connected with the ground and supply lines related thereto, without departing from the spirit of this invention.

In the form of the invention illustrated, the supply means F includes a U-shaped ground bus 41 and several U-shaped power buses 42 arrangeed and supported in the cavity X, in insulated spaced relationship from each other and from the walls of the shell by suitable dielectric support plates or brackets 43. The structure further includes a control box 44, which box carries one manually operable on and off switch 45 for each power bus and is connected therewith by a power line extending through a suitable flexible loom L extending between the typodont and the control box.

The loom L extends through a suitable fitting in the opening 40 in a rear wall 27 of the shell and the lines are suitably connected with the adjacent ends of the buses related thereto.

The switches 45 are connected with the output side of a manually operable rheostat 47 arranged in and carried by the box 44 by means of a suitable bus 48. The input side of the rheostat 47 is connected with the output side of a step-down transformer 49 arranged in and carried by the box 44. The input side of the transformer 49 is connected with and receives power from a suitable service outlet (not shown), in a conventional manner.

The several heater elements E are connected with and between the ground bus 41 and one of the power buses 42 by means of special clip type connectors, such as alligator type clips, by soldering or, as illustrated, by simply wrapping the lead ends 36 of the elements about the buses, as circumstances require or as desired.

The elements E of adjacent and/or related teeth or predetermined groups of teeth can be connected with a predetermined power bus and the ground bus or can be connected in parallel with a predetermined power bus and the ground bus as desired or as circumstances require and as clearly illustrated in the wiring diagram in FIG. 5 of the drawings.

With the structure set forth above, it will be apparent that my structure is such that it can be set up, electrically, in several different arrangements to meet and satisfy a multitude of different possible requirements and that the rate and degree of heating of the matrix, by the heating elements about each tooth, can be easily and accurately controlled.

In practice, the heating element for each tooth can be of any desired form and construction. For example, and as illustrated in FIG. 6 of the drawings, the element E' can be in the form of a strip heater engaged about and carried by the root portion 31' of the tooth T'. The root portion 31' of the tooth can be suitably notched and grooved to cooperatively receive and retain the element.

If desired, and as illustrated in FIG. 6 of the drawings, the ends of the heating element related to each tooth can be provided with apertured terminal posts 50, which post can be engaged in suitable sockets or equivalent mechanical coupling means related to the ground and power lines can be directly connected by soldering or by threading the lines through the posts.

It is to be understood that, in practice, all of the teeth need not be provided with heater elements or, if so provided, all need not be connected with the ground and power lines or bus.

Throughout the specification and in the appended claims the term "wax" is employed as a generic term and is intended to include any and all thermoplastic substances or compounds which may be advantageously employed in carrying out my invention.

Having described only typical preferred forms and applications of my invention, I do not wish to be limited to the specific details herein set forth, but wish to reserve to myself any modifications and/or variations that may appear to those skilled in the art and which fall within the scope of the following claims.

Having described my invention, I claim:

1. In a typodont of the character referred to a simulated jawbone having an inwardly opening U-shaped cavity extending about the line along which teeth are arranged, a wax matrix in and projecting inwardly from the cavity and a plurality of simulated teeth with root portions in said matrix and crown portions projecting substantially inwardly from the matrix, heating means carried by certain of said teeth and including electrical heating elements at the root portions of said teeth, electrical power supply means connected with the heating elements and control means remote from the typodont and connected with and controlling the supply of power through said supply means and the electrical heating elements.

2. A structure as set forth in claim 1 wherein, said electrical heating elements include resistance wires wound helically about the root portions of said teeth and having lead ends extending therefrom to connect with the power supply means.

3. A structure as set forth in claim 1 wherein, said electrical heating elements include resistance wires wound helically about the root portions of said teeth and having leads ends extending therefrom to connect with the power supply means, said root portions of the teeth having helical grooves to cooperatively receive and hold said resistance wires in place.

4. A structure as set forth in claim 1 wherein, said electrical heating elements include resistance wires wound helically about the root portions of said teeth and having lead ends extending therefrom to connect with the power supply means, said root portions of the teeth having helical grooves to coopeartively receive and hold said resistance wires in place, and openings therethrough at the ends of the grooves through which said lead ends are engaged to anchor the elements in place.

5. A structure as set forth in claim 1 wherein, said electrical heating elements include resistance strip heater elements engaged about portions of the root portions of the teeth.

6. A structure as set forth in claim 1 wherein, said electrical heating elements include resistance strip heater elements engaged about the portions of the root portions of the teeth, and having terminal posts to connect with the power supply means.

7. A structure as set forth in claim 1 wherein, said power supply means includes a power source, manually operable on and off switches connected with said power source and power lines extending between and connecting said switches to predetermined electrical heating elements.

8. A structure as set forth in claim 1 wherein, said power supply means includes a power source, manually operable on and off switches connected with said power source and power lines extending between and connecting said switches to predetermined electrical heating elements, said power source including a manually operable variable resistance means.

9. A structure as set forth in claim 1 wherein, said electrical power supply means includes a power source, manually operable on and off switches connected with said power source and power lines, extending between and connecting said switches to predetermined electrical heating elements, said power source including a stepdown transformer connected with a power service outlet and a manually operable variable resistance means at the output side of the transformer and supplying current to the switches.

10. A structure as set forth in claim 1 wherein, said electrical power supply means includes a power source, manually operable on and off switches connected with said power source and power lines, extending between and connecting said switches to predetermined electrical heating elements, said power source including a stepdown transformer connected with a power service outlet and manually operable variable resistance means at the output side of the transformer and supplying current to the switches, certain of said electrical heating elements being connected together and with their related power lines in series and certain other related electrical heating elements being connected with their related power lines in parallel.

References Cited

UNITED STATES PATENTS

| | | | |
|---|---|---|---|
| 2,539,278 | 1/1951 | Schwehr et al. | 32—71 |
| 3,226,827 | 1/1966 | Spalten | 32—71 XR |
| 3,299,512 | 1/1967 | Brigante | 32—71 |

LOUIS G. MANCENE, *Primary Examiner.*

R. PESHOCK, *Assistant Examiner.*